(12) United States Patent
Cambou (10) Patent No.: US 11,233,662 B2
(45) Date of Patent: Jan. 25, 2022

(54) KEYLESS ENCRYPTING SCHEMES USING PHYSICAL UNCLONABLE FUNCTION DEVICES

(71) Applicant: Arizona Board of Regents on Behalf of Northern Arizona University, Flagstaff, AZ (US)

(72) Inventor: Bertrand F Cambou, Flagstaff, AZ (US)

(73) Assignee: Arizona Board of Regents on Behalf of Northern Arizona University, Flagstaff, AZ (US)

( * ) Notice: Subject to any disclaimer, the term of this patent is extended or adjusted under 35 U.S.C. 154(b) by 274 days.

(21) Appl. No.: 16/724,739

(22) Filed: Dec. 23, 2019

(65) Prior Publication Data

US 2020/0213140 A1     Jul. 2, 2020

Related U.S. Application Data

(60) Provisional application No. 62/785,068, filed on Dec. 26, 2018.

(51) Int. Cl.
*H04L 29/06* (2006.01)
*H04L 9/32* (2006.01)
*H04L 9/06* (2006.01)

(52) U.S. Cl.
CPC .......... *H04L 9/3278* (2013.01); *H04L 9/0618* (2013.01); *H04L 9/0643* (2013.01)

(58) Field of Classification Search
CPC .... H04L 9/3278; H04L 9/0618; H04L 9/0643
See application file for complete search history.

(56) References Cited

U.S. PATENT DOCUMENTS

| | | | |
|---|---|---|---|
| 5,881,153 A | 3/1999 | Feldman et al. | |
| 6,535,980 B1 | 3/2003 | Kumar et al. | |
| 8,347,091 B2 | 1/2013 | Nonaka et al. | |
| 8,868,923 B1 * | 10/2014 | Hamlet | G06F 21/32 713/186 |
| 8,874,921 B2 | 10/2014 | Buldas et al. | |
| 8,966,245 B2 | 2/2015 | Aday et al. | |
| 10,511,451 B2 * | 12/2019 | Lu | H04L 9/3278 |
| 2009/0279691 A1 | 11/2009 | Farrugia et al. | |

(Continued)

FOREIGN PATENT DOCUMENTS

| WO | 0174004 A1 | 10/2001 |
|---|---|---|
| WO | 2019027702 A1 | 2/2019 |

*Primary Examiner* — Michael Simitoski
*Assistant Examiner* — Hany S. Gadalla
(74) *Attorney, Agent, or Firm* — Quarles & Brady LLP (57) ABSTRACT

Systems and methods of encrypted communication between a server and client devices using keyless encryption schemes are disclosed. Client devices with arrays of physical-unclonable-function devices respond to challenges from a server. Characteristics of the arrays are stored by the server during a secure enrollment process. Subsequently, the server issues challenges to the clients. The clients derive a ciphertext according to a variable cipher scheme determined using responses to the challenges issued by the server using characteristics of portions of the arrays specified by the challenges. The server and clients may independently determine encryption and decryption procedures using characteristics of the arrays.

20 Claims, 8 Drawing Sheets

(56) References Cited

U.S. PATENT DOCUMENTS

| | | | | |
|---|---|---|---|---|
| 2014/0091832 A1* | 4/2014 | Gotze | ............... | H03K 19/003 |
| | | | | 326/8 |
| 2015/0234751 A1* | 8/2015 | Van Der Sluis | ...... | H04L 9/0866 |
| | | | | 713/193 |
| 2016/0006570 A1* | 1/2016 | Falk | .................. | H04L 9/0866 |
| | | | | 380/44 |
| 2016/0364583 A1* | 12/2016 | Benoit | ............... | H04L 9/3278 |
| 2017/0046281 A1* | 2/2017 | Chandra | ............ | G06F 21/79 |
| 2017/0142081 A1 | 5/2017 | Jutla | | |
| 2017/0237573 A1* | 8/2017 | Goettfert | ............ | G06F 21/72 |
| | | | | 713/193 |
| 2018/0123808 A1* | 5/2018 | Hung | ................ | H04L 9/0866 |
| 2018/0212609 A1* | 7/2018 | Usuda | ............... | H03L 1/025 |
| 2018/0278418 A1* | 9/2018 | Chang | ............... | H04L 9/0869 |
| 2019/0342105 A1* | 11/2019 | Adams | ............. | H04L 9/3278 |

\* cited by examiner

KEYLESS ENCRYPTING SCHEMES USING PHYSICAL UNCLONABLE FUNCTION DEVICES

CROSS-REFERENCE TO RELATED APPLICATIONS

The present application claims priority to U.S. Provisional Application 62/785,068 entitled "Keyless Encryption Schemes with Addressable Physically Unclonable Elements" and filed on Dec. 26, 2018.

BACKGROUND OF THE INVENTION

Information is frequently encrypted to protect against eavesdropping and unauthorized access using encryption schemes based on the use of one or more encryption keys and other keyless encryption schemes. Encryption schemes are frequently used in conjunction with authentication schemes to improve the security of electronic systems. PUF-based security systems use a PUF device as an "electronic fingerprint" unique to a user or device in possession or control of the PUF device, allowing an authentication system to challenge a client seeking authentication, receive a response generated by the client using a PUF device, and then compare the received with a stored response previously received from the client or derived from characteristics of the PUF device and verifying that the two responses match. PUF devices may also be used to generate encryption keys for use with various encryption schemes.

BRIEF SUMMARY

In an example embodiment, a system, comprises a processor, a physical-unclonable-function ("PUF") array of PUF devices, and memory coupled to the processor. The memory stores instructions that, upon execution by the processor, cause the processor to: receive enciphering instructions and a message; extract, from the enciphering instructions, a set of addresses and a set of corresponding sequence values; and divide the message into message fragments, each message fragment associated with an associated address and an associated sequence value.

Upon execution by the processor, the instructions further cause the system to generate a ciphertext by performing an encryption procedure that comprises measuring, for each message fragment, a characteristic of an associated PUF device for that message fragment identified by the associated address for that message fragment; deriving, for each message fragment, an encoded fragment derived from the measured characteristic of the associated PUF device; and concatenating the encoded fragments in an order derived from the set of corresponding sequence values. Upon execution by the processor, the instructions further cause the system to transmit the ciphertext to a server.

In another example embodiment a system comprises a processor, a physical-unclonable-function ("PUF") array of PUF devices, and memory coupled to the processor. The memory stores instructions that, upon execution by the processor, cause the processor to receive deciphering instructions and a ciphertext; extract, from the deciphering instructions, a set of addresses and a corresponding set of sequence values; and divide the ciphertext into ciphertext fragments, each ciphertext fragment associated with an associated address and an associated sequence value, each associated address identifying a PUF device belonging to the PUF array.

Upon execution by the processor, the instructions further cause the system to retrieve a plaintext by performing a deciphering procedure that comprises measuring, for each ciphertext fragment, a characteristic of the associated PUF device for that ciphertext fragment identified by the associated address for that ciphertext fragment; deriving, for each ciphertext fragment, a decoded fragment for using the measured characteristic of the associated PUF device; and concatenating the decoded fragments in an order derived from the corresponding set of sequence values extracted from the deciphering instructions.

In another example embodiment a system comprises a processor, and memory coupled to the processor. The memory stores device characteristics of a physical-unclonable-function ("PUF") array belonging to a client device and having a plurality of PUF devices, each device characteristic associated with a physical measurement of a PUF device belonging to the PUF array. The memory also stores instructions.

Upon execution by the processor, the instructions cause the system to receive a message and processing instructions; and extract a set of addresses and a set of corresponding sequence values from the processing instructions. Upon execution by the processor, the instructions further cause the system to generate a transformed string by dividing the message into message fragments and associating each message fragment with an address and its corresponding sequence value; for each message fragment, retrieving, from the memory, a corresponding device characteristic identified by the associated address; generating transformed fragments representing each message fragment with a value determined by a function of the value of that message fragment and the corresponding device characteristic; and concatenating the transformed fragments in an order derived from the set of corresponding sequence values The above features and advantages of the present invention will be better understood from the following detailed description taken in conjunction with the accompanying drawings.

BRIEF DESCRIPTION OF THE DRAWINGS

The drawings described herein constitute part of this specification and includes example embodiments of the present invention which may be embodied in various forms. It is to be understood that in some instances, various aspects of the invention may be shown exaggerated or enlarged to facilitate an understanding of the invention. Therefore, drawings may not be to scale.

DETAILED DESCRIPTION

The described features, advantages, and characteristics may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments.

Reference throughout this specification to "one embodiment," "an embodiment," or similar language means that a particular feature, structure, or characteristic described in connection with the embodiment is included in at least one embodiment. Thus appearances of the phrase "in one embodiment," "in an embodiment," and similar language throughout this specification may, but do not necessarily, all refer to the same embodiment. References to "users" refer generally to individuals accessing a particular computing device or resource, to an external computing device accessing a particular computing device or resource, or to various processes executing in any combination of hardware, software, or firmware that access a particular computing device or resource. Similarly, references to a "server" refer generally to a computing device acting as a server, or processes executing in any combination of hardware, software, or firmware that access control access to a particular computing device or resource.

Conventional systems and methods for secure communication frequently rely upon encryption of messages using encryption keys which may be symmetrical or asymmetrical (e.g., in public key encryption schemes). Such key-based encryption schemes have disadvantages. First keys must be generated and stored by various parties, introducing the possibility that the keys may be compromised by a malicious party. Additionally, key-based encryption schemes may be vulnerable to brute force attacks wherein a malicious party may discover the key given access to a message encrypted with that key.

Accordingly, embodiments disclosed herein address these and other shortcomings by using physical unclonable function (PUF) generators (APGs) to implement a keyless encryption scheme where a client with a APG and a server with knowledge of device characteristics of the APG communicate using a variable cipher without the need to communicate details of the varying cipher scheme with each other. Given one or more random numbers or other seed values, the client and server may independently generate instructions allowing encryption and decryption of a message using a block cipher scheme which varies for each block of the message. The cipher scheme cannot be intercepted because only a device in possession of the correct PUF array or characteristics of that PUF array (i.e., the client or the server) can generate the appropriate instructions for each block.

In the context of this disclosure, a challenge is any information transmitted to an APG to cause production of an expected response (referred to as a "challenge response") corresponding to that information. Challenge responses may be generated by accessing devices (or ranges of devices) in an array of PUF devices belonging to the APG. Along these lines, a challenge may be input supplied to an APG which is used to produce a response having one or more expected values which depend upon characteristics' of the PUF array belonging to the APG to which the challenge is issued. The appropriate challenge response may be derived from those characteristics using instructions stored by the APG or other processing circuitry, received by the APG or other processing circuitry and/or additional information supplied to the APG or other processing circuitry (such as a password of a user). In one simple non-limiting example, a challenge might simply be returning the values stored by devices of a PUF array at a specified address or range of addresses. In other non-limiting examples, a challenge might include instructions to perform a mathematical, logical, or other operation(s) on those values.

Non-limiting examples of measurable physical characteristics of devices used in PUF arrays are time delays of transistor-based ring oscillators and transistor threshold voltages. Additional examples include data stored in SRAM or information derived from such data. For instance, in a PUF array based on SRAM cells, an example of such physical characteristics may be the effective stored data values of individual SRAM devices (i.e., "0" or "1") after being subjected to a power-off/power-on cycle. Because the initial state (or other characteristics) of an individual PUF device may not be perfectly deterministic, statistics produced by repeated measurements of a device may be used instead of single measurements. In the example of an SRAM-based PUF device, the device could be power-cycled 100 times and the frequency of the "0" or "1" state could be used as a characteristic of that device. Other non-limiting examples of suitable characteristics include optical measurements. For instance, a PUF device may be an optical PUF device which, when illuminated by a light source such as a laser, produces a unique image. This image may be digitized and the pixels may be used as an addressable PUF array. A good PUF should be predictable, and subsequent responses to the same challenge should be similar to each other (and preferably identical).

Additional non-limiting examples of non-limiting examples of measurable physical characteristics of devices used in PUF arrays are currents induced by an applied input voltage or current, voltages of various circuit elements during operation of a PUF device in response to an input or other stimulus. Further non-limiting examples may include derived quantities such as resistance, conductance, capacitance, inductance, and so on. In certain embodiments, such characteristics of a device may be functions of an input or stimulus level of the device. For example, a current-voltage characteristics of memristors and other devices may be non-linear. Thus, the measured resistance of a memristor will depend on a current or voltage level applied during the measurement process. If a memristor or device with similar characteristics is operated within a non-hysteretic regime, the measured resistance may be a predictable function of the input stimulus (e.g., an input current supplied by a current source). Thus the relationship between applied current and voltage measured across a memristor (or between applied voltage and current measured through the memristor) is one example of a non-linear transfer function which can be exploited to produce multiple discrete or continuous characteristic values using a single PUF device.

Figure 1:
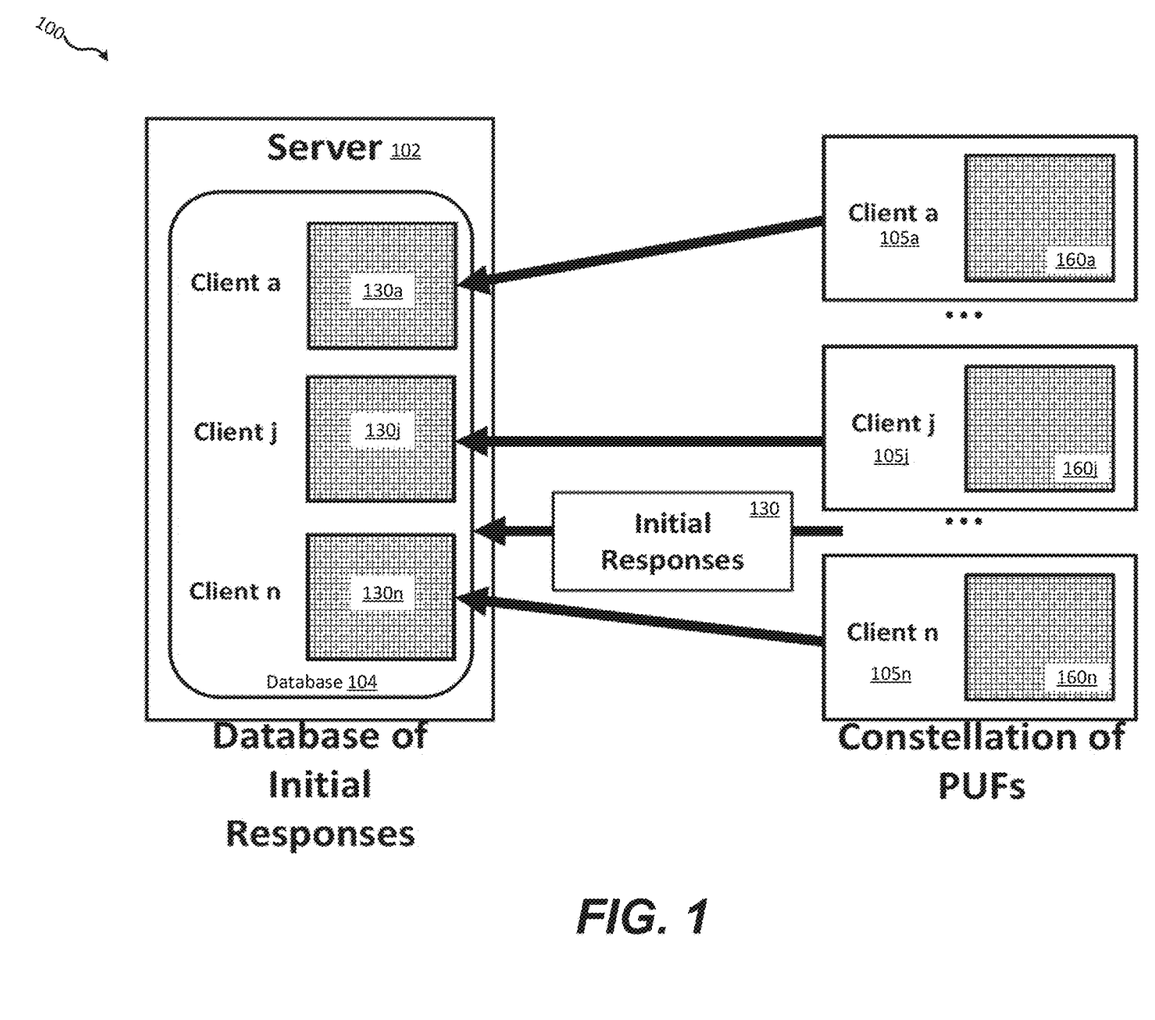
FIG. 1 depicts an enrollment procedure wherein a server issues challenges to clients having PUF arrays and stores responses to those challenges for use in subsequent authentication of the clients, according to one embodiment.

According to various embodiments, an encryption protocol enabled by PUFs includes the following stages: (1) Enrollment, (2) Handshaking, (3) Ciphertext generation, and (4) Ciphertext Decryption. These stages are described below, beginning with reference to FIG. 1 illustrating an example environment 100 in which embodiments disclosed herein may be practiced. The environment 100 includes a server 102 and client devices, hereinafter clients 105 (represented by clients 105a, 105j, and 105n). The server 102 manages a database 104 which may be stored in memory of the server 102. The database 104 stores characteristics of the PUF arrays 160 of each client (i.e., "images" of each PUF array 160), which may be generated in response to challenges issued by the server 102 to the clients 105, each of which may respond to the challenges by accessing a respective PUF array 160 represented by the PUF arrays 160a, 160j, and 160n belonging to clients 105a, 105j, and 105n. Alternatively, the server 102 may be otherwise provided with information suitable to generate the initial challenge responses 130.

A PUF array 160 may form parts of an addressable PUF generator (APG), described further below, which may contain additional processing circuitry and execute instructions for generating challenge responses. Enrollment is performed for each client 105 in a secure environment. After enrollment, the constellation of clients 105 may operate in an insecure environment and communicate with each other over public networks. Secure information needs to be encrypted.

Figure 2:
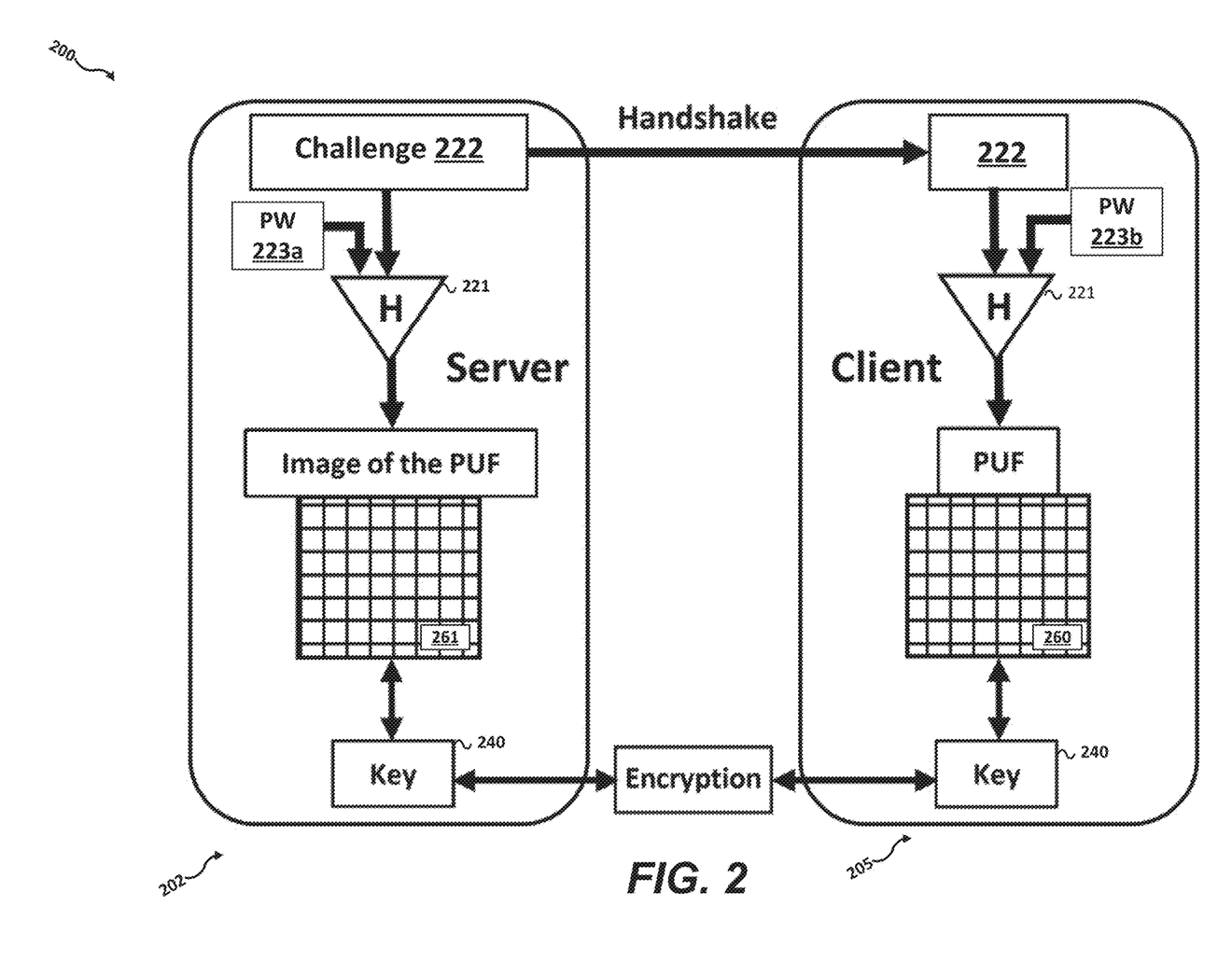
FIG. 2 is a block diagram of a client device with an addressable PUF generator (APG), interacting with a server to independently generate shared encryptions keys.

FIG. 2 illustrates a simplified example embodiment 200 of where a client 205 (i.e., having an APG communicates with a server 202 according to an encryption scheme in which the server 202 and client 205 communicate securely be encrypting communications between them with an encryption key 240 that is independently generated by the client 205 and the server 202 using a challenge 222 issued by the server 202 to the client. The APG 210 includes a PUF array 260 which may be accessed by a microcontroller of the APG 210 or other processing circuitry of the client 205. The PUF array 260 of a client 205 is an array of electronic or other devices with measurable physical characteristics, configured in an addressable array similar to an addressable memory device such as RAM or ROM chip. Due to small variations which occur during semiconductor manufacturing or other manufacturing processes, each PUF device (and hence each PUF array 260) may be unique, even if the PUF arrays are mass-produced by a process designed to produce nominally identical devices. The PUF array 210 (shown as a 2D-array of cells) of a client 205 may be accessed by the client 205 which receives challenges 222 (originating in this example from the server 202). The APG 210 responds by to challenges 222 by generating responses 230 using measured characteristics of one or more PUF devices within the PUF array 260 identified by the challenge 222 or derived from it using instructions stored by the APG 210. As shown, the challenge 222 (which may be a random number, seed value, or any other suitable string, bitstream or other information) may be used to generate addresses and/or other instructions using a hashing function 221. Additional security may be provided by combining the challenge 222 with an optional password such as the password 223a for the client 202 and the password 223b for the client 205. The passwords 223a,b may be the same or different.

The APG 210 contains a PUF array 260 that is unique to the client 205. The APG 210 of the client 205 may be used to generate numerous responses 230 unique to that client 205. These responses 230 cannot be replicated by an attacker without physical access to the PUF array 260. The responses 230 may be used as the encryption key 240 or may be otherwise used to derive the encryption key 240. The server 202 may similarly use the image 261 of the PUF array 260 and the challenge to independently generate the key 240 or derive it.

After the clients 205 are enrolled with the server 202, embodiments disclosed herein may be utilized to authenticate the client 205 and produce the encryption key 240 which the server 202 and client 205 may use to communicate securely. First, the server 202 and the client 205 enter the Handshaking stage. In the Handshaking stage an objective is for the server 202 to transmit the information needed to identify a particular portion of the PUF array 260 of the client 205. Both the server 202 and the client 205 can independently produce a response to the challenge: the server can lookup information about the PUF array 260 obtained during enrollment (or otherwise supplied to the server 202) and the client 205 can retrieve the same information by using the APG 210 to access the PUF array 260.

During Handshaking, the server 202 issues a challenge 222 to the APG 210 of the client 205. This challenge 222 is used by the APG 210 to identify the portion of the devices belonging to the PUF array 260 to access. This challenge 222 may be a random number. In some embodiments, the server 202 and the client 205 may have access to the same random number generator or may have synchronized random number generators. In such embodiments, the server 202 does not need to transmit the challenge 222 to the client 205 in order for the client 205 to generate the challenge response 230 using the APG 210.

In some embodiments the ability of the client 205 to generate the challenge response 230 may be protected by a password such as the password 223b. In such embodiments, the address specifying which device(s) in the PUF array 260 to access may be produced by combining the challenge 222 with the password. As a non-limiting example, the client 205 may input the password and the challenge into a hashing function to produce the address in the PUF array 260. As an example, if the PUF array 260 is represented as a two-dimensional array containing 256 rows and 256 columns, 8 bits of the message digest can be used to find a first coordinate X in the PUF array 260; the following 8 bits can be used to find a second coordinate Y.

The measurement of characteristics of individual PUF devices may not be perfectly deterministic. As part of the Handshaking process, the server 202 may send additional information to the client 205 for use in making generation of the challenge response 230 more reliable. Such information may include a checksum or other error-correcting information for use with error-correcting codes, or other information or instructions used in response generation schemes to be discussed later below. Upon receiving the challenge response 230, the APG 210 may use the additional to generate corrected response or exclude unreliable devices belonging to the APG 260 from the response generation process. The server may determine that certain devices of the PUF array 260 are unreliable using the image 261 of the PUF array 260 and may transmit information identifying unreliable devices to the client 205. The client 205 may also independently determine that certain devices are unreliable such that both the server 202 and the client 205 agree on devices which should be excluded. Other error-correction methods may also be employed.

One approach for dealing with non-zero error rates entails repeated measurement of the characteristic(s) of the PUF devices forming a PUF array such as the PUF array 260. During Enrollment, the server may issue each possible challenge repeatedly and track the statistical distribution of values measured for each PUF device. The server may then determine that certain PUF devices are "unreliable" and should not be used to generate responses and store information to that effect. During Handshaking, the server may then transmit that information to the client or the client may already store similar or identical information. Additional methods for error reduction may be used to augment or replace the approach above. One such additional method also entails repeatedly measuring each PUF device and assigning values to the measured characteristic(s) of that PUF device based on the ranges of the measurement values. For instance one value may be assigned to measurements that fall within a first range and another value assigned to values in a second range exclusive of the first range, and so on. As long as the measured values for a device remain within one range, that device may be used to produce a reliable value during response generation. As before, devices which are "unreliable" (i.e., their measured values do not remain within a single range, or deviate from that range with unacceptable frequency) may be excluded from use in response generation and other procedures requiring reliable values.

Figure 3:
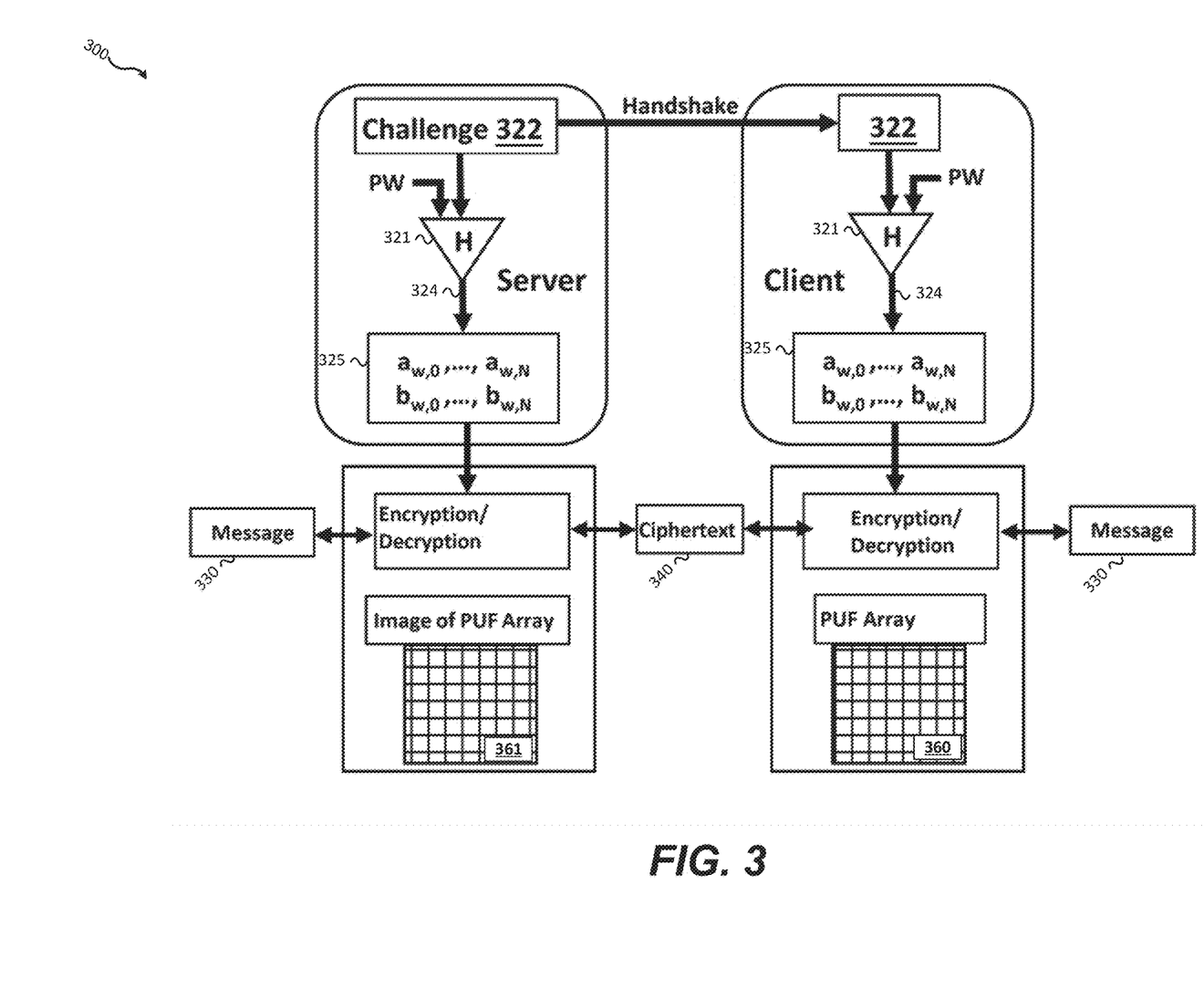
FIG. 3 is a block diagram of a client device with an addressable PUF generator (APGs), interacting with a server using a keyless PUF-enabled encryption scheme.

FIG. 3 shows an example embodiment 300 in which a server 302 communicates securely with a client 305 using a keyless encryption scheme enabled by the use of PUFs according to an. In this scheme, as described above, the server 302 stores an image 361 of a PUF array 360 belonging to (or otherwise controlled by or associate with) the client 305. In the embodiment shown, the server 302 issues a challenge 322 to the client 302. The challenge 322 may be converted into a message digest 324 generated from the challenge 322 using the hashing function 321, for example. Instructions 325 may be extracted from the message digest 324 by either the server 302 or the client 305, as appropriate. For example, the client 305 may use measurements of the PUF array 360 to generate a ciphertext 340 from a message 330 using the instructions 325, as described further below, and transmit the ciphertext 340 to the server 302. The server 302 may then decrypt the ciphertext 340 using device characteristics stored in the image 361 of the PUF array 360 using the instructions 325 to recover the message 330. The server 302 may also encrypt the message 330 using the image 361 of the PUF array 360 to form the ciphertext 340. In this instance, the client 302 may use the instructions extracted from the message digest 324 to recover the message 330. In some embodiments, the server 302 and client 305 may access a shared random number generator or have synchronized random number generators. In such embodiments, the challenge 322 may be a random number generated by the shared random number generator of independently generated by the server 302 and the client 305. In such embodiments, the server 302 may not need to send the challenge 322 to the client 305. In other embodiments, the client 305 may generate the ciphertext 340 and transmit the challenge to the server 302, thereby allowing the server to recover the message 330.

As in PUF-enabled key-based cryptographic schemes (such as depicted by the example of FIG. 2) and other PUF-based authentication schemes, images of addressable PUFs associated with client devices are stored by the server and contain data obtained during Enrollment of the client devices as previously described. For use with keyless schemes such as the scheme represented by FIG. 3, the initial readings of the initial measurement of the PUF devices need to be comprehensive. For example, each device (or "cell") may characterized using as many as 1,000 successive measurements under different electrical conditions (e.g., with varying currents and voltages.) For example, in experiments performed by the inventors, the resistances of cells of memristor-based PUF arrays were measured 51 times at five different current levels: 10 nA, 50 nA, 100 nA, 200 nA, and 400 nA. For each cell, the average value of the resistance at each current was stored in a lookup table. An APG such as the APG 310 may also include additional circuitry to allow measurement of temperature at or near individual PUF devices. In such instances, a PUF image may also contain device characteristics measured at different temperatures or information from which the temperature-dependent behavior of device characteristics may be predicted.

The message digest 324 may be divided into a set of addresses $\{a_0 n \ldots a_n\}$ that identify locations of particular PUF devices in the PUF array 360 (or locations of data associated with those devices in the image 361 of the PUF array 360) and a corresponding set of numbers $\{b_0 \ldots b_n\}$. or other sequencing information used to determine a sequence or ordering, as described further below. Generally, in certain embodiments, the client 305 may divide the message 330 into fragments and express those fragments as binary numbers. For each fragment, the client device may associate that fragment with one of the addresses and a corresponding number belonging to the sequencing information. The client device 305 may then access a PUF device belonging to the PUF array 360 at the address associated with that fragment and measure a characteristic of that PUF device. The client 305 may then encode each message fragment using a transformation based on a value of that message fragment (e.g., the binary representation of that message fragment) and the measured characteristic of the associated PUF device. Finally, the client 305 may concatenate the message fragments in a scrambled sequence determined using the set of sequencing numbers $\{b_0 \ldots b_n\}$, as described further below. Because only the server 302 and the client 305 can measure (or retrieve) characteristics of the PUF devices belonging to the PUF array 360, only the server 302 can decrypt messages encrypted by the client 305. Similarly, only the client 305 can decrypt messages encrypted by the client 302 using characteristics of the PUF array 360 of the client 305. For increased security, the message 330 may be segmented into multiple segments (i.e., blocks) and a new randomly generated challenge 322 may be used to determine the cipher scheme for each segment of the message 330. The number of addresses in the set of addresses and the set of sequencing numbers may also be adjusted to allow the encryption of messages of various lengths. Further details are discussed below.

In an example, the challenge 322 is used to generate the message digest 324 using a standard hashing function (experimental validation was performed using SHA-3, for example). Other suitable hashing functions are MDA, SHA-1, and SHA-2, as non-limiting examples. A message may be subdivided into multiple bitstreams, collectively used to form the addresses $\{a_0 \ldots a_n\}$ and "sequencing numbers" $\{b_0 \ldots b_n\}$. In some embodiments, it may be desirable to specify a large number of addresses (and/or a number of long address) and sequencing numbers using a single message digest derived from a single challenge 322. A method 400 of generating sets of addresses and sequencing numbers having many more bits than the message digest 324 is illustrated by FIG. 4.

Figure 4:
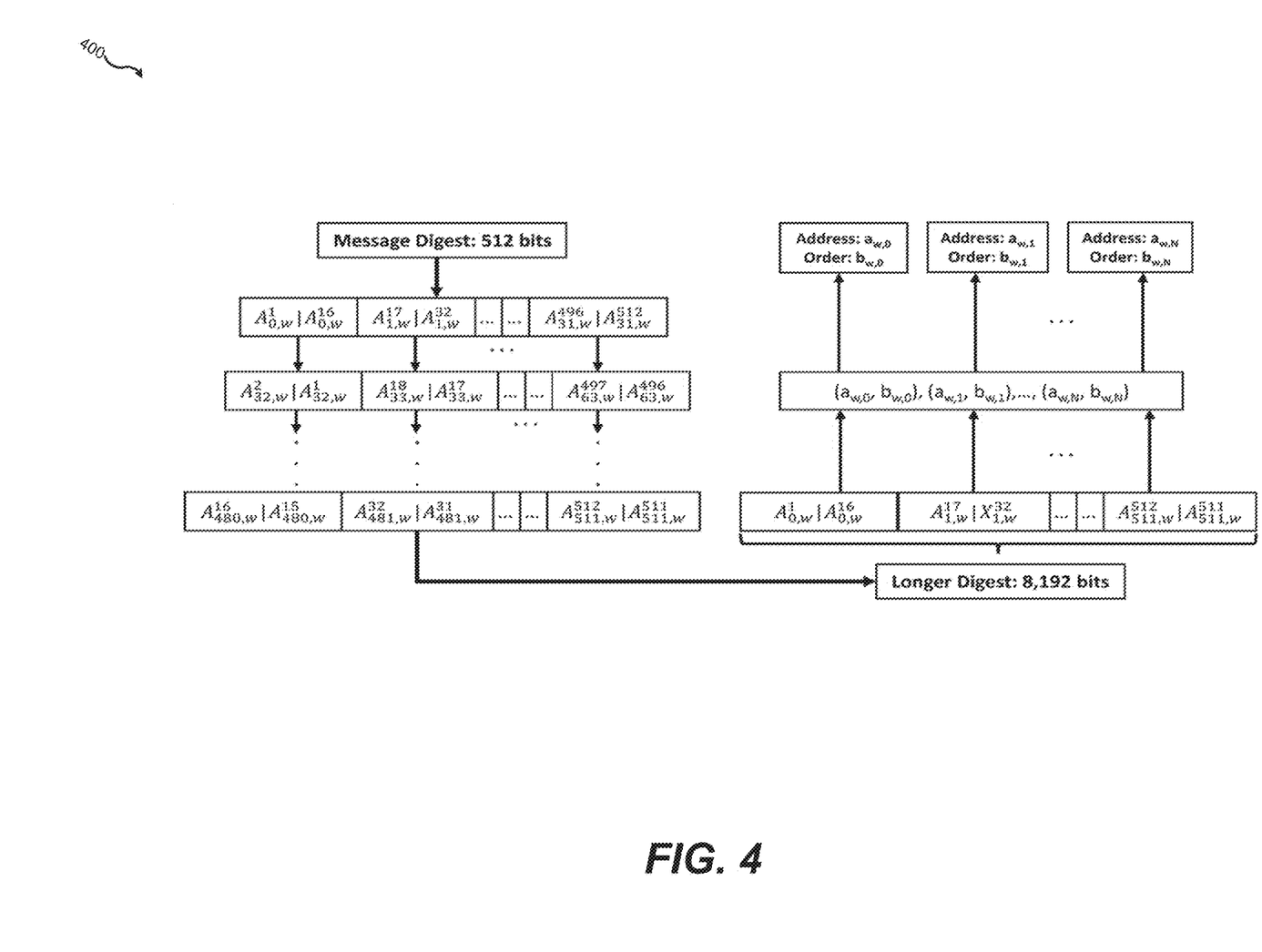
FIG. 4 is a schematic diagram illustrating a procedure used in certain embodiments when generating encryption instructions from a message digest.

As shown in FIG. 4, an SHA-3 message digest is 512 bits long. This digest may be used to derive instructions (e.g., the instructions 325) that are collectively much longer than 512 bits. First, the original message digest is segmented into 16-bit chunks denoted where. The bits of the message digest A are denoted by $A_i^k$, where the index i indicates which chunk the bit belongs to and the index k indicates the bit's overall position in the digest. Thus the first chunk (i=1) contains bits 1-16, the second chunk (i=2) contains bits 17-32, and so on until the final chunk (1=32), which contains bits 496-512:

| $\|A_1^1 \ldots A_{1,}^{16}\|$ | $\|A_2^{17} \ldots A_2^{32}\|$ | $\ldots$ | $\|A_{32}^{496} \ldots A_{32}^{512}\|$ |
|---|---|---|---|

As a non-limiting example, the original digest A may be expanded by concatenating additional unique strings generated by permuting the bits of the digest A in any acceptable manner. One such method comprises cyclically permuting bits belonging to the chunks inA, thereby shifting the position of each bit in a chunk one position to the left (or right). For instance, if a left cyclical permutation is used, a second bitstream (chunks 33-64) is formed having the arrangement:

| $\|A_{33}^2 \ldots A_{33}^{16}\|A_{33}^1$ | $\|A_{34}^{18} \ldots A_{34}^{32}\|A_{34}^{17}$ | $\ldots$ | $\|A_{64}^{497} \ldots A_{64}^{512}\|A_{64}^{496}$ |
|---|---|---|---|

The cyclical permutation described above can be performed a total of 15 times before the original digest is reproduced. Thus, using this example method, a 512-bit digest can be transformed into in an 8,192-bit-long without duplication of the original 16-bit chunks by concatenating the original digest with 15 additional strings generated as described.

If an example PUF array such as the PUF array 360 is a 2D array of 1024×1024 cells, there will be 1,048,576 addresses required to address each cell directly, required at least a 20-bit address length. If a block cipher using 256 PUF measurements is chosen, an 8,192-bit-long string can be used to provide 256 20-bit addresses along with the 8-bits required to provide a sequencing number with 256 possible values (i.e., an 8-bit number) corresponding to each address. It is not necessary that every address being unique, nor that every sequencing number be unique. In particular, a non-limiting simplified example of a procedure to accommodate repeated sequencing values within one block is as follows: (1) the sequencing numbers $\{b_0 \ldots b_n\}$ are ranked from smallest to highest value. (2) The lowest ranked number is assigned the first position in the sequence. (3) if duplicate numbers exist, the first duplicate encountered is assigned to the next available position and subsequent duplicate numbers are again assigned to the next available position in the sequence, as illustrated by the example below for a set of nine sequencing numbers. The index i indicates the order in which the numbers $b_i$ are encountered. $O_i$ indicates the position in the sequence assigned for that number $b_i$:

| i | 1 | 2 | 3 | 4 | 5 | 6 | 7 | 8 | 9 |
|---|---|---|---|---|---|---|---|---|---|
| $b_i$ | 5 | 3 | 8 | 4 | 5 | 6 | 8 | 5 | 7 |
| $O_i$ | 2 | 0 | 7 | 1 | 3 | 5 | 8 | 4 | 6 |

Figure 5:
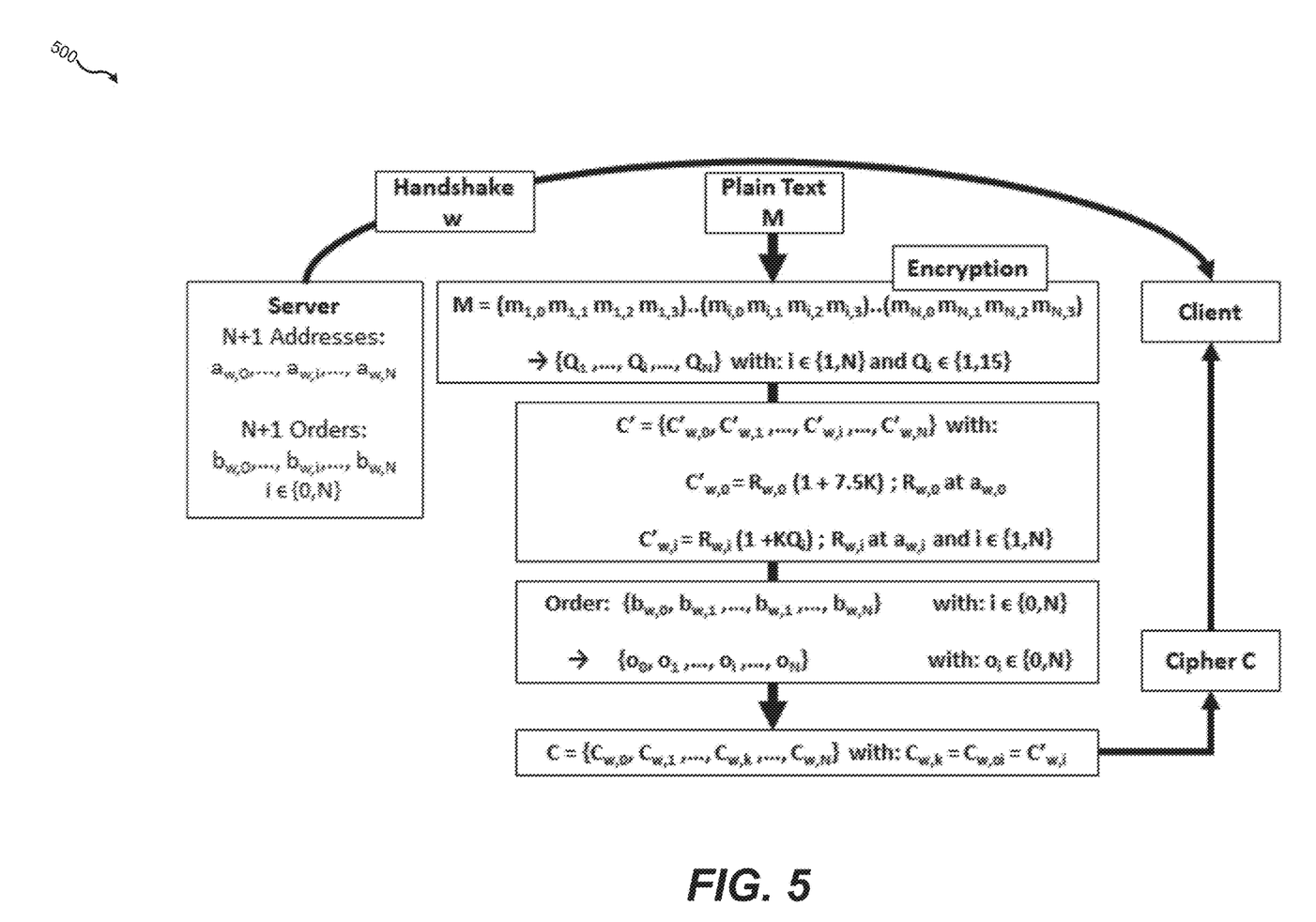
FIG. 5 is a flow diagram depicting an encryption procedure that may be practiced using the embodiment of FIG. 3.

FIG. 5 illustrates an example encryption procedure 500 according to certain embodiments. At this point of the scheme, N+1 addresses $(a_0, \ldots, a_n)$, and N+1 sequence values $(b_0, \ldots, b_n)$ that are re-ordered as $(O_0, \ldots, O_N)$ independently generated by the server and the client device are transmitted to their respective encryption/decryption modules. Various quantities are shown with the subscript w in FIG. 5 to indicate that they apply for a given Handshake w (i.e., a particular challenge sent as part of that Handshake communication). In some embodiments, a message is broken into multiple segments, each of which is encrypted and decrypting based on an additional challenge.

A message M (e.g., the message 330) to encrypt is a stream of 4×N bits that are fragmented into 4-bit message fragments. In this example, $M=m_{i,1}|m_{i,2}|m_{i,3}) \ldots (m_{N,0}|m_{N,1}|m_{N,2}|m_{N,3})$. Each fragment (i.e., the i-th fragment) may be represented by a natural number $Q_i \in \{0, 15\}$ yielding a set of numbers $\{Q_1, \ldots Q_i, \ldots Q_N\}$ with i$\in\{1, N\}$. For each i-th message fragment the resistance $R_n$ may be read by the server (e.g., the server 302) from a look-up table (e.g., the image 361 of the PUF array 360), or measured by the client using the PUF array belonging to the client (e.g., the PUF array 360 of the client 305). The PUF device used to obtain $R_n$ is identified by the address $a_i$ associated with the i-th message fragment. Given the resistance values of the PUF devices associated with the message fragments, encoded message fragments C' are computed as follows by measuring characteristics of the PUF devices wherein the measurement conditions of each measurement are determined by the corresponding message fragment value. For instance, each memristor of the PUF array may have be characterized at one of 16 input levels. Due to the nonlinear current-voltage characteristics of the memristors, each of the 16 input levels will produce a different resistance level when measured (in contrast to a conventional resistor which has constant resistance over an extremely wide range of measurement conditions). The variation in resistances between the individual memristor devices means that an attacker cannot determine the encoded scheme without access to the device characteristics.

First, a reference value $R_0$ is encoded as $C'_i$. This reference value is not related to the message itself and is instead used to calibrate the resistance values used to encode the message fragments. In this example, $C'_0 = R_0 (1+7.5K)$. $R_0$ is read at an address $a_0$ generated from the message digest as described above. The reason that the value is multiplied by (1+7.5K), is to make the result as neutral as possible when compared with the other values. On average all other values are also multiplied by the same factor, 7.5 as is the average value of $Q_i$, with values varying from 0 to 15. In this example, the parameter K can take arbitrary values typically from 0.2 to 2, as long as the communicating parties use the same number. The factor K may arbitrary number, large enough to differentiate the resulting $C'_i$ to minimize the error rate during decryption. K should be much larger than the intra-cell standard variation of the resistance measured at a given current/temperature. Intra-cell variations have been observed in the 0.1-1% range, so K=0.2 gives enough margin to design the encrypting device.

Next, values for the encoded message fragments are determined by $C'_i=(1+K*Q_i)$ where $R_i$ is read at the address $a_i$ associated with each i-th message fragment. The resulting encoded data stream $C'=\{C'_0, C'_1, \ldots, C'_i, \ldots, C'_n\}$ is generated. In this particular example, a memristor-based PUF array is used and the message fragment values determine measurement conditions. For example, if $Q_i=0$, the resistance of the appropriate memristor may be measured at a minimum input current value whereas if $Q_i=15$, the highest input current value may be used. Due to the non-linear current-voltage transfer function of each memristor, the measured resistance will vary widely depending on the input current level used for the measurement.

Finally, the sequencing numbers are used to scramble the ordering of the encoded data C' as described above, yielding a ciphertext derived from the original message and measurements of the PUF array. The sequencing numbers are needed to finalize the encryption and permute the encoded fragments of C' into the final ordered ciphertext C according to the order $O=\{O_0, O_1, \ldots, O_i, \ldots, O_N\}$. Thus $C=\{C_0, C_1, \ldots, C_k, \ldots, C'_n\}$ where $C_k=C'_{O_i}=C'_i$ and $k \in \{0, N\}$. The block cipher has thereby been permuted by the orders generated by the message digests.

The encryption scheme described can be augmented with the use of additional nonce and random numbers to enhance entropy and make frequency analysis difficult. As non-limiting examples, randomly-generated strings or individual bits may be inserted at positions known to the sender and receiver. In some embodiments, such random information is included in the message prior to fragmentation and the random information is scrambled along with the original message data as described above. In such embodiments, just as certain fragments may be reserved for reference values (e.g., the reference resistance described above), certain fragments may be used for random information or other information. In some embodiments, error correction information may be included using similar methods (i.e., insertion at fixed locations in the message or resulting ciphertext, or at locations determined by instructions extracted from the message digest). The error correction information may include, as non-limiting examples, check bits, parity bits or other information generated and utilized according to suitable error-correcting codes or other error-correction schemes.

The table below is a simplified example of an encryption process according to one embodiment using a 32-bit long message for illustration. The message is fragmented into 8 4-bit message fragments corresponding to index values $i \in \{1,8\}$. As above, an additional fragment for the reference value described above is included (1=0).

| i | 0 | 1 | 2 | 3 | 4 | 5 | 6 | 7 | 8 |
|---|---|---|---|---|---|---|---|---|---|
| $M_i$ | | 0110 | 0101 | 0100 | 1011 | 0001 | 0110 | 1001 | 0110 |
| $Q_i$ | | 6 | 5 | 4 | 11 | 1 | 6 | 9 | 7 |
| $R_i$ | 1.7 | 2.5 | 2.9 | 2.1 | 1.2 | 2.2 | 1.9 | 2.6 | 2.0 |
| | | $C'_0 = R_0(1 + 7.5K)$; $C'_i = R_i(1 + KQ_i)$ $K = 0.2$ | | | | | | | |
| $C'_i$ | 4.25 | 5.5 | 5.8 | 3.78 | 3.84 | 2.64 | 4.18 | 7.28 | 4.8 |
| $b_i$ | 5 | 3 | 8 | 4 | 5 | 6 | 8 | 5 | 7 |
| $O_i$ | 2 | 0 | 7 | 1 | 3 | 5 | 8 | 4 | 6 |
| $C_i$ | 5.5 | 3.78 | 4.25 | 3.84 | 7.28 | 2.64 | 4.8 | 5.8 | 4.18 |

Figure 7:
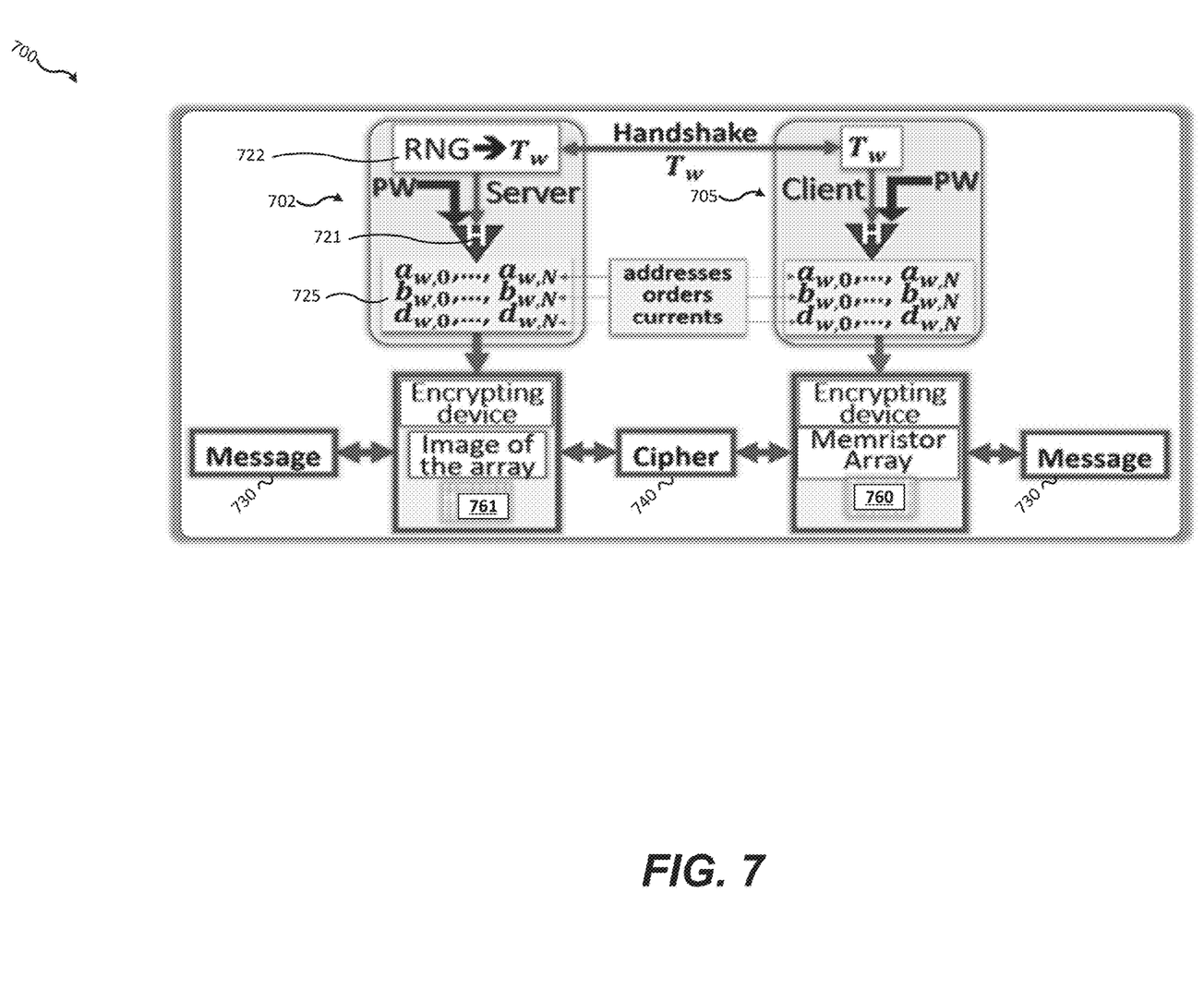
FIG. 7 is a block diagram of a client device with an addressable PUF generator (APGs), interacting with a server using a keyless PUF-enabled encryption scheme according to another embodiment.

The message M=01100101010010110001011010010111 is broken into the fragments $M_i$ shown. Each fragment $M_i$ is converted into a natural number $Q_i$. The resistances of the corresponding PUF devices are measured. In this example, the encoded fragment $C'_i$ for each message fragment is determined using the transformation shown which depends on the value of $Q_i$. In some embodiments, $Q_i$ is used to determine a parameter of the resistance measurement (e.g., an input current level associated with the measurement) as described above, in which case the encoded fragment may depend only on the appropriately measured resistance value. In other embodiments, measurement instructions may be extracted from the message digest analogously to the addresses and sequencing instructions as illustrated by FIG. 7 and described below. The values of the resistance, in M-ohm at the 9 cells selected by the set of addresses $a_i$ shown in the table are then ordered using the sequencing numbers $b_i$ and ordered in the sequence specified by re-ordering $O_i$ as described previously. Finally, the cipher C is converted into a digital stream and transmitted to the receiving party.

Figure 6:
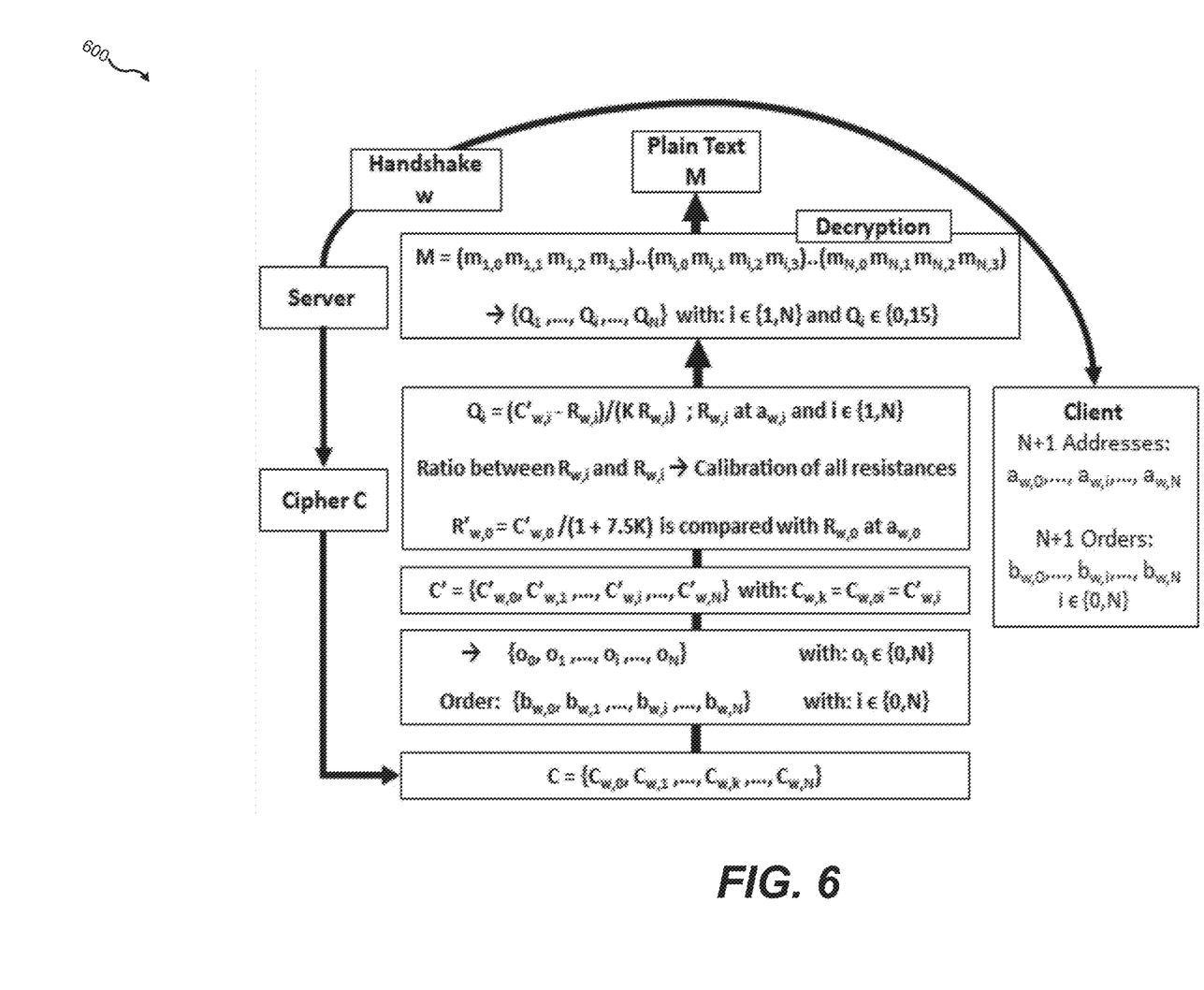
FIG. 6 is a flow diagram depicting a decryption procedure that may be practiced using the embodiment of FIG. 3.

FIG. 6 illustrates an analogous decryption procedure which operates according to similar principles as the encryption procedure described above with the exception that the transformation between the message fragments and the encoded fragments of FIG. 5 as described above is inverse to the decoding transformation of FIG. 6 (i.e., multiplication instead of division in this example). The server may decrypt a ciphertext received from the client using the appropriate challenge and device characteristics retrieved from a lookup table accessed by the server. Alternatively, a client may decrypt a ciphertext sent by the server using the same challenge and actively measuring the appropriate device characteristics.

As mentioned above, some characteristics of suitable PUF devices (e.g., memristor resistances, transistor channel resistances, and other characteristics) may be temperature dependent. Furthermore, there may be no guarantee that subsequent measurements of a given PUF device will occur at the same temperature as measurement values stored in an image of a PUF array accessed by a server. Accordingly, FIG. 6 shows a comparison between a reference value of a device characteristic (a resistance) included in a ciphertext generated by a client device, denoted $R'_0$ and the corresponding value $R_0$ measured previously. The freshly-measured resistance values extracted from the ciphertext may be transformed using the ratio of $R'_0$ to $R_0$ to compensate for temperature effects when the resistances measure vary linearly with temperature or another suitable transformation may be applied given knowledge of the temperature-dependent behaviors of a particular PUF technology.

FIG. 7 shows an embodiment 700 related to the embodiment of FIG. 3 in which a server 702 communicates with client 705. The server may issue a challenge 722 (represented by the random number I', for a particular Handshaking instance). Using the same hashing function 721, the server 702 and client 705 generate the instructions 725 which may be used for encryption or decryption as previously described using measurements of characteristics of the devices belonging to the PUF array 760 or the previously-measured characteristics stored in the image 761 of the PUF array 760 accessed by the server 702. The server 702 or client 705 may use the instructions 725 to encrypt a message 730 or decrypt a ciphertext 740 to retrieve the message 730 as previously described. The instructions 725 of embodiment 700 differ from the instructions 325 of embodiment 300 in that, in addition to addresses $\{a_0 \ldots a_n\}$ and sequencing values $\{b_0 \ldots b_n\}$, the instructions 725 include an additional set of measurement parameters, $\{d_0 \ldots d_n\}$ (represented in FIG. 7 as input current levels used for measurements of memristor devices of the PUF array 760). Just as the addresses identify the PUF devices measurements to use and the sequence values are used to determine how to arrange portions of the ciphertext 740 derived from those PUF devices and the message 730, the measurement parameters identify the measurement conditions the client 705 will use for the corresponding PUF device. The measurement parameters similarly identify which measurements of a given PUF device the sever 702 will retrieve from the image 761 of the PUF array 760 storing previous measurements of each PUF devices conducted under various conditions (e.g., a set of resistance values for each PUF device where each resistance values corresponds to particular input current level).

Figure 8A:
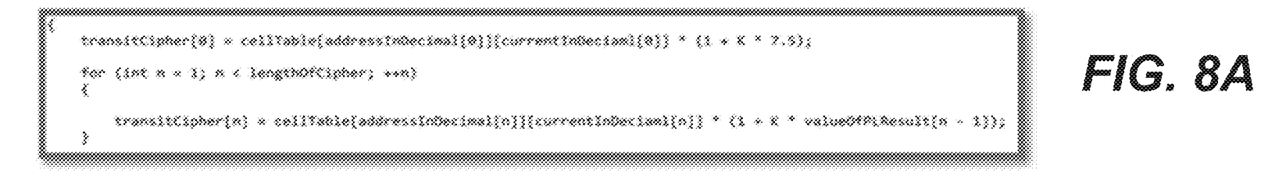
FIGS. 8A-C are code snippets from example software implementations of embodiments disclosed herein.
Figure 8B:
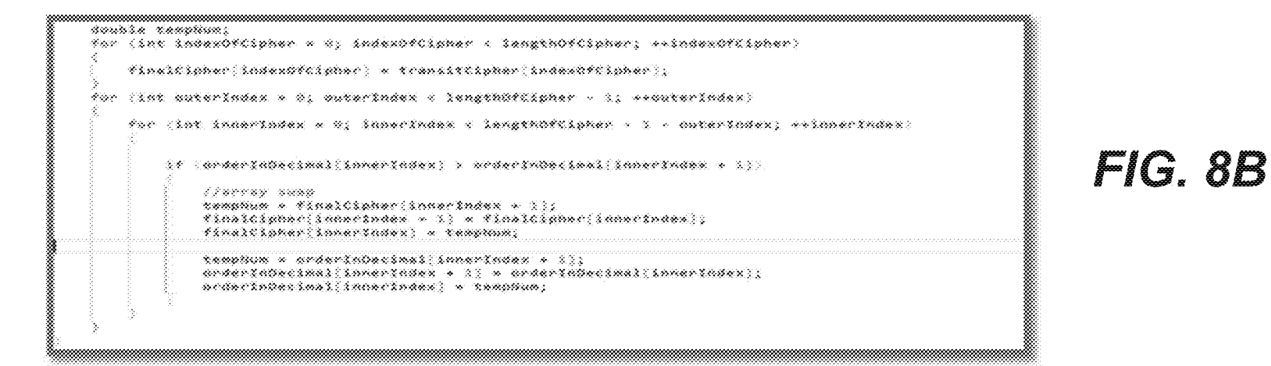
Figure 8C:
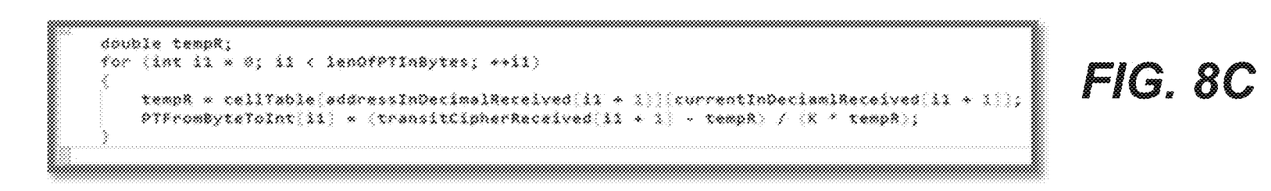

FIGS. 8A-C are code snippets from example software implementations of encryption and decryption protocols described herein. FIG. 8A shows code for generating the intermediate (unscrambled) ciphertext C' according to embodiment 700 (in which the instructions 725 specify current input levels for each PUF measurement used to generate the intermediate ciphertext C'. The transit cipher C' is reordered to get the final ciphertext C which is sent to the receiver side. The reordering tasks use "orderInDecimal" array. C' is sorted with the "orderInDecimal" array that has been generated using instructions extracted from a message digest as described above. FIG. 8B shows code for generating the final ciphertext C, in the ordering derived from the sequence values as previously described.

FIG. 8C shows example code implementing decryption of the ciphertext. After Handshaking, both communicating parties share the same long message digest (8192 bits), and have access to the same measured device characteristics, addresses, orders, and measurement currents. The final cipher C is converted into the cipher C' with the "orderInDecimal" array. For reverse derivation, it has been needed to create a helper array which is named "IndexArrayForFinalCipher". The initial value of this array is from 0 to (C's size −1). Then, the decimal order array ("orderInDecimal") and "IndexArrayForFinalCipher" arrays are reordered. In this example implementation, the bubble sort algorithm is used to resort both the array orderInDecimal and the array "IndexArrayForFinalCipher". After obtaining the transit cipher, the existing formula to compute hexadecimal value (0-15) of each block (4 bits) in the plain text will be called to get the value of each block.

It should be understood that, unless explicitly stated or otherwise required, the features disclosed in embodiments explicitly described herein and elsewhere in this disclosure may be used in any suitable combinations and using various suitable parameters. Thus, as a non-limiting example, any method described herein or any other suitable method may be used to determine measurement parameters of for measuring the characteristics of PUF device. As a non-limiting example, the message length, the size of message fragments, address lengths, the size of PUF arrays used and other parameters may be varied as desired for different applications. It should also be understand that while memristor-based PUF devices are discussed in the examples herein, they are intended as non-limiting examples of suitable PUF technologies.

The invention claimed is:

1. A system, comprising:
 a processor, a physical-unclonable-function ("PUF") array of PUF devices, and memory coupled to the processor, the memory storing instructions that, upon execution by the processor, cause the processor to:
 receive enciphering instructions and a message;
 extract, from the enciphering instructions, a set of addresses and a set of corresponding sequence values;
 divide the message into message fragments, each message fragment associated with an associated address and an associated sequence value;
 generate a ciphertext by performing an encryption procedure that comprises:
 measuring, for each message fragment, a characteristic of an associated PUF device for that message fragment identified by the associated address for that message fragment;
 deriving, for each message fragment, an encoded fragment derived from the measured characteristic of the associated PUF device; and
 concatenating the encoded fragments in an order derived from the set of corresponding sequence values; and
 transmit the ciphertext to a server.

2. The system of claim 1 wherein each PUF device belonging to the array of PUF devices has a non-linear transfer function relating inputs to the device to outputs of the device;
 wherein measuring the characteristic of the associated PUF device for each message fragment comprises measuring a value of the non-linear transfer function of that PUF device; and
 wherein deriving the encoded fragment for each message fragment comprises applying a mathematical transformation to the characteristic of the associated PUF device for that message fragment measured at an input level determined by a value of that message fragment.

3. The system of claim 2 wherein the non-linear transfer function of each PUF device relates an input current level to a voltage value measured while applying the an electrical current having the input current level to that PUF device.

4. The system of claim 2 wherein the memory stores further instructions that, upon execution by the processor, cause the system to:
 measure a reference characteristic of a reference PUF device identified by a reference address belonging to the set of addresses; and
 include the measured reference characteristic in the ciphertext at a position determined by the sequence value associated with the reference address.

5. The system of claim 2, wherein the non-linear measuring the non-linear transfer function of the corresponding PUF device comprises measuring at least one the following of the corresponding PUF at a selected input level:
 an electrical resistance;
 a capacitance;
 an inductance;
 a current; and
 a voltage.

6. The system of claim 1,
 wherein extracting the set of addresses and the sequence values comprises:
 dividing the enciphering instruction into a set of instruction segments, each instruction segment identifying a corresponding subset of the addresses and a corresponding set of sequence values; and
 wherein generating the ciphertext further comprises:
 dividing the message into message segments corresponding to the instruction segments;

performing the encryption procedure on each message segment using the corresponding instruction segment to produce a corresponding ciphertext segment; and concatenating the corresponding ciphertext segments.

7. The system of claim 6,
wherein extracting the set of addresses and the sequence values further comprises:
permuting a sequence of values of the enciphering instructions to form additional enciphering instructions;
dividing the additional enciphering instructions into additional instruction segments identifying corresponding subsets of the addresses and corresponding segment sequences; and
including the additional instruction segments in the set of instruction segments.

8. The system of claim 1, wherein the system is configured to receive the enciphering instructions by providing an input to a hashing function that generates a message digest output as the enciphering instructions.

9. The system of claim 1, further comprising extracting a set of corresponding measurement parameters from the enciphering instructions, the measurement parameters specifying input conditions to be used when measuring the characteristic of the associated PUF device for each message fragment.

10. The system of claim 1,
wherein the system is configured, when generating the ciphertext, to concatenate one or more additional values with at least one of the encoded fragments at a location in the ciphertext determined by the order derived from the set of corresponding sequence values; and
wherein the additional values comprise at least one of: a set of nonce values and a set of error correction values.

11. A system, comprising:
a processor, a physical-unclonable-function ("PUF") array of PUF devices, and memory coupled to the processor, the memory storing instructions that, upon execution by the processor, cause the processor to:
receive deciphering instructions and a ciphertext;
extract, from the deciphering instructions, a set of addresses and a corresponding set of sequence values;
divide the ciphertext into ciphertext fragments, each ciphertext fragment associated with an associated address and an associated sequence value, each associated address identifying a PUF device belonging to the PUF array;
retrieve a plaintext by performing a deciphering procedure that comprises:
measuring, for each ciphertext fragment, a characteristic of the associated PUF device for that ciphertext fragment identified by the associated address for that ciphertext fragment;
deriving, for each ciphertext fragment, a decoded fragment for using the measured characteristic of the associated PUF device; and
concatenating the decoded fragments in an order derived from the corresponding set of sequence values extracted from the deciphering instructions.

12. The system of claim 11, wherein each PUF device belonging to the array of PUF devices has a non-linear transfer function relating inputs to the device to outputs of the device; and wherein measuring the characteristic of the associated PUF device for each ciphertext fragment comprises measuring a value of the non-linear transfer function of the associated PUF device for that ciphertext fragment; and
wherein deriving the decoded fragment for each ciphertext fragment comprises applying a mathematical function to characteristic of the associated PUF device for that ciphertext measured at an input level determined by a value of that ciphertext fragment.

13. The system of claim 12 wherein the memory stores further instructions that, upon execution by the processor, cause the system to:
measure a reference characteristic of a reference PUF device identified by the set of addresses and extract a transmitted reference value from the ciphertext at a position determined by the order derived from the corresponding set of sequence values extracted from the deciphering instructions,
determine a transformation that, when applied to the characteristic value of the reference PUF device, produces the transmitted reference value
apply the transformation to the characteristic of each PUF device to before deriving the decoded fragment for each message fragment.

14. The system of claim 11,
wherein extracting the set of addresses and the sequence values comprises:
dividing the deciphering instructions into a set of instruction segments, each instruction segment identifying a corresponding subset of the addresses and corresponding segment sequence values; and
wherein retrieving the plaintext further comprises:
dividing the ciphertext into ciphertext segments containing the ciphertext fragments, each ciphertext segment corresponding to an instruction segment;
performing the decryption procedure on each ciphertext segment using the corresponding instruction segment to produce a corresponding ciphertext segment; and
concatenating the ciphertext segments.

15. The system of claim 14, wherein extracting the set of addresses and the sequence values further comprises:
permuting an arrangement of values of the deciphering instructions to form additional deciphering instructions;
dividing the additional deciphering instructions into additional instruction segments identifying corresponding subsets of the addresses and corresponding sets of sequence values; and
including the additional instruction segments in the set of instruction segments.

16. A system, comprising a processor, and memory coupled to the processor, the memory storing:
(a) device characteristics of a physical-unclonable-function ("PUF") array belonging to a client device and having a plurality of PUF devices, each device characteristic associated with a physical measurement of a PUF device belonging to the PUF array;
(b) executable instructions that, when executed by the processor, cause the processor to:
receive a message and processing instructions;
extract a set of addresses and a set of corresponding sequence values from the processing instructions; and generate a transformed string by:
dividing the message into message fragments and associating each message fragment with an address of the PUF array belonging to the client device and its corresponding sequence value;
for each message fragment, retrieving, from the memory, a corresponding device characteristic identified by the associated address;
generating transformed fragments representing each message fragment with a value determined by a function of the value of that message fragment and the corresponding device characteristic; and
concatenating the transformed fragments in an order derived from the set of corresponding sequence values.

17. The system of claim 16, wherein the memory stores further instructions that, when executed by the processor, cause the processor to:
transmit a seed value to a client device;
generate the processing instructions by converting the seed value into a message digest using a hashing function;
receive, as the message, a ciphertext from the client device.

18. The system of claim 17, wherein the memory stores further instructions that, when executed by the processor, cause the processor to:
extract a reference device characteristic value associated with a reference PUF drive from the message at a location in the message determined by the order derived from the set of corresponding sequence values;
retrieve, from the memory, a stored reference device characteristic associated with the reference PUF device;
determine a deviation between the reference device characteristic extracted from the ciphertext and the stored reference device characteristic;
determine a compensating transformation that corrects for the deviation; and
apply the compensating transformation to each message fragment.

19. The system of claim 16, wherein retrieving the corresponding device characteristic for each message fragment comprises selecting a measurement of the corresponding device characteristic associated with a measurement condition determined by the value of that message fragment.

20. The system of claim 16,
wherein the memory stores further instructions that, when executed by the processor, cause the system to extract a set of corresponding measurement parameters from the processing instructions; and
wherein retrieving the corresponding device characteristic for each message fragment comprises selecting a measurement of the corresponding device characteristic associated with a measurement condition determined by the value of that message fragment.

* * * * *